(12) United States Patent
Ohnemus

(10) Patent No.: US 6,935,282 B2
(45) Date of Patent: Aug. 30, 2005

(54) VEHICLE HAVING AN INTERNAL COMBUSTION ENGINE AND A FUEL CELL AND METHOD OF MAKING A VEHICLE

(75) Inventor: Ulrich Ohnemus, Hattenhofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 135 days.

(21) Appl. No.: 10/188,077

(22) Filed: Jul. 3, 2002

(65) Prior Publication Data

US 2003/0033992 A1 Feb. 20, 2003

(30) Foreign Application Priority Data

Aug. 16, 2001 (DE) .......................................... 101 40 210

(51) Int. Cl.⁷ ............................ B60L 11/18; B60K 1/00
(52) U.S. Cl. ..................................... 123/3; 123/27 GE
(58) Field of Search ............................ 123/3, 27 GE, 123/DIG. 12, 1 A

(56) References Cited

U.S. PATENT DOCUMENTS

| | | | |
|---|---|---|---|
| 4,716,859 A | * | 1/1988 | Konig et al. .................... 123/3 |
| 5,662,184 A | | 9/1997 | Reimer et al. |
| 5,887,554 A | * | 3/1999 | Cohn et al. ...................... 123/3 |
| 5,976,723 A | * | 11/1999 | Boffito et al. .................... 123/3 |
| 6,205,957 B1 | * | 3/2001 | Saylor ..................... 123/27 GE |
| 6,209,494 B1 | * | 4/2001 | Manikowski, Jr. et al. ...... 123/3 |
| 6,311,650 B1 | * | 11/2001 | Lamm ............................. 123/3 |
| 6,463,889 B2 | * | 10/2002 | Reddy ............................. 123/3 |
| 6,502,533 B1 | * | 1/2003 | Meacham ....................... 123/3 |
| 6,508,210 B2 | * | 1/2003 | Knowlton et al. .............. 123/3 |
| 6,571,747 B1 | * | 6/2003 | Gerstwiler ...................... 123/3 |

FOREIGN PATENT DOCUMENTS

| | | |
|---|---|---|
| DE | 197 03 171 A1 | 8/1998 |
| DE | 19913795 | 10/2000 |
| DE | 19923315 | 11/2000 |
| DE | 19931061 | 1/2001 |
| DE | 19928102 | 11/2001 |
| EP | 0 677 417 A1 | 10/1995 |
| JP | 2000 303836 A | 10/2000 |

OTHER PUBLICATIONS

Copy of German Office Action.

* cited by examiner

*Primary Examiner*—Henry C. Yuen
*Assistant Examiner*—Jason Benton
(74) *Attorney, Agent, or Firm*—Crowell & Moring LLP

(57) ABSTRACT

A vehicle includes an internal combustion engine and a fuel cell for supplying electric vehicle systems. The fuel cell is thermally "coupled" with the internal combustion engine. The waste heat of the internal combustion engine is used for heating the fuel cell, that is, for maintaining the operating temperature of the fuel cell. The fuel cell is arranged directly on the engine where, in the case of conventional vehicles, the transmission is arranged. The transmission is arranged in the area of the rear axle in front of the rear-axle divider transmission.

24 Claims, 2 Drawing Sheets

VEHICLE HAVING AN INTERNAL COMBUSTION ENGINE AND A FUEL CELL AND METHOD OF MAKING A VEHICLE

BACKGROUND AND SUMMARY OF THE INVENTION

This application claims the priority of Application No. 101 40 210.4-22, filed Aug. 16, 2001, in Germany, the disclosure of which is expressly incorporated by reference herein.

The present invention relates to a vehicle having an internal combustion engine and a fuel cell and a method of making a vehicle.

In modern mid-size and large-size vehicles, the internal combustion engine is arranged in the longitudinal direction of the vehicle. Normally, an auxiliaries drive is provided on the face of the engine. Auxiliaries, such as air conditioners, hydraulic pumps, etc. are mounted in the forward area of the engine or laterally and are driven by V-ribbed belts. The transmission may be an automatic multiposition reduction transmission or a manual transmission and is usually arranged in the area between the engine and the rear axle near the engine. Between the engine and the transmission, a hydrodynamic torque converter or a dry friction clutch is arranged. The starter for the internal combustion engine is normally a direct-current motor which, during the start, supplies its torque, after being multiplied by a planetary transmission, an engaging mechanism and a starting ring gear, to the crankshaft of the engine.

In a vehicle with a rear-axle drive, a propeller shaft leads from the transmission output shaft toward the rear to a divider transmission (axle transmission) and, by way of drive shafts, to the two rear wheels. In a vehicle with an all-wheel drive, a divider transmission is arranged behind the transmission, which divider transmission "divides," with or without multiplication, the drive torque between a propeller shaft to the front axle and another propeller shaft to the rear axle. In this case, a divider transmission for "dividing" the drive torque between the two front wheels is also provided on the front axle.

Because of various advantages, it can be expected that, in the future, vehicles will be equipped with an electromagnetic valve gear as a standard component. A prerequisite is a particularly efficient "device for generating electric energy". Luxury vehicles, in particular, will be equipped with additional electrical systems in the future. Such systems are frequently summarized by the term "by-wire". Examples are brake-by-wire system, shift-by-wire systems, steer-by-wire systems, etc. Attempts to provide the required electric energy using a battery and a crankshaft starting generator, which combine the functions of a starter and a generator, result in installation space problems. There is also the problem that an optimal efficiency cannot be reached simultaneously for the starter and generator functions.

Another problem of conventional vehicle concepts is the axle load distribution, because the front axle has to carry the main load of the transmission line. Particularly in the case of luxury vehicles, the transmission lines have a high weight, which is becoming less and less compatible with the requirement of sustainable use of resources.

It is therefore an object of the invention to provide a vehicle with an improved "drive and energy supply concept".

This object is achieved by the invention described hereinafter and shown in the drawings.

The basic principle of the invention involves a vehicle having an internal combustion engine and a fuel cell for supplying electricity to electric vehicle systems, the fuel cell being thermally "coupled" with the internal combustion engine. Specifically, the waste heat of the internal combustion engine is used to heat the fuel cell, that is, for maintaining the operating temperature of the fuel cell.

There are currently five basic types of fuel cells differentiated on the basis of the used electrolyte:

an alkaline fuel cell a membrane-type fuel cell a phosphoric-acid-type fuel cell a molten-carbonate-type fuel cell a solid-oxide-type fuel cell.

The operating temperature of these five basic types differs greatly and, depending on the type, is between 70° C. and 1,000° C.

In conventional vehicles, the waste heat of the internal combustion engine escapes largely unused through the exhaust system into the environment. In the present invention, this heat is utilized for "heating" the fuel cell. The fuel cell is preferably flanged directly to the housing of the internal combustion engine, allowing efficient heat transfer.

According to a further development of the invention, the fuel cell is arranged where the manual or automatic transmission is situated in conventional vehicles. The transmission is placed toward the rear, for example, in front of the rear-axle divider transmission allowing better axle load distribution.

The fuel cell is an auxiliary power unit and supplies electricity to various electric devices, such as an electromagnetic valve gear (EVT), the vehicle wiring, various by-wire systems, the air conditioner, and devices which operate also when the internal combustion engine has stopped.

The hydrogen required for the operation of the fuel cell can be obtained, for example, by means of a fuel reformer from the liquid fuel of the internal combustion engine. The reformate which is formed during "hydrogen separation," can be used as a "fuel addition" for the internal combustion engine, for example, during the cold start, or, in the case of natural gas engines, in "rich operation" for the reduction of $NO_x$. As an alternative, the reformate can also be fed to the waste gas in front of the catalyst, which permits a waste gas after treatment to reduce nitrogen oxide using hydrogen.

The transmission, arranged near the rear-axle divider transmission, may be a high-speed manual transmission or an infinitely variable speed transmission, such as a fully toroidal drive. The arrangement of the transmission near the rear axle has the advantage that the propeller shaft is only designed for the torque and speed ranges of the engine. The reason for this advantage is that because engine speed is higher and torque is lower, the weight of the propeller shaft is lower. In addition, a "transaxle transmission arrangement" permits placing of the fuel cell near the engine. Particularly, a fully toroidal transmission can be used because it can be operated without a torque converter and has a relatively "slim construction."

Hydrogen, natural gas, diesel or gasoline can be used as fuel for the internal combustion engine. The engine preferably has an electromagnetic valve gear because it has a number of advantages, such as an almost throttle-free charge cycle, the possibility of a variable cylinder cut-off, the reduction of the cold start drag moment, etc. The electromagnetic valve gear is preferably supplied with current by the fuel cell to obtain a good electric efficiency.

According to a further development of the invention, a connectable electric "accessory drive" is provided. The accessory drive preferably is a "disk-shaped" electric motor, which has a relatively large diameter and a comparatively short length, so that it can be arranged in the forward area of the internal combustion engine.

The accessory drive has various functions. On the one hand, it can be used as a "starter" for the internal combustion engine. On the other hand, it can be connected with the front wheels by way of a "coupling device" or by way of a "freewheel" and drive shafts, and can be used as a connectable front-axle drive. In the coasting operation of the vehicle, the accessory drive operates as a "generator" to recover the braking energy. The electric energy generated in the coasting operation is fed into a vehicle battery. In the "motor operation", the accessory drive is supplied with current by the fuel cell.

The "accessory drive" can also be switched to a passive mode. In this case, the accessory drive is used only as a passive torque transmission device, the drive torque for the front wheels being generated by the internal combustion engine. This means that a torque can be transmitted from the internal combustion engine by way of the deactivated accessory drive to the front wheels.

Depending on vehicle size, a small transmission can be arranged in front of the front-axle divider transmission, which small transmission converts the torque of the accessory drive into a front-axle torque. The "front-axle transmission line" is preferably designed only for low-load operation, which permits a light and cost-effective construction.

Summarizing, the following advantages are achieved by the invention:
- better axle load distribution by the transmission arrangement in the area of the rear axle;
- an accessory drive for the front axle which can be easily and cost-effectively implemented;
- braking energy recovery by way of the front axle and the accessory drive;
- a compact manual transmission with a significantly "increased torque capacity";
- use of an infinitely variable speed transmission, particularly a fully toroidal transmission without a converter clutch;
- an optimal arrangement of a fuel cell as an additional power supply unit near the engine to supply power to the vehicle wiring, the electric accessory drive, the auxiliary air conditioner, and electricity consuming devices when the engine has stopped;
- reduced cold-start emissions;
- shortening of the warm-up phase of the engine;
- auxiliary heating for the interior;
- optimized heat management;
- reduced cost in catalyst technology because a direct addition of fuel into the engine can take place in the warm-up or cold-start phase respectively, as well as an addition into the exhaust system in front of the catalyst;
- efficiency-optimized power generation.

Other objects, advantages and novel features of the present invention will become apparent from the following detailed description of the invention when considered in conjunction with the accompanying drawings.

In the following, the invention will be explained in detail by means of an embodiment in connection with the drawing.

DETAILED DESCRIPTION OF THE PREFERRED EMBODIMENT

Figure 1:
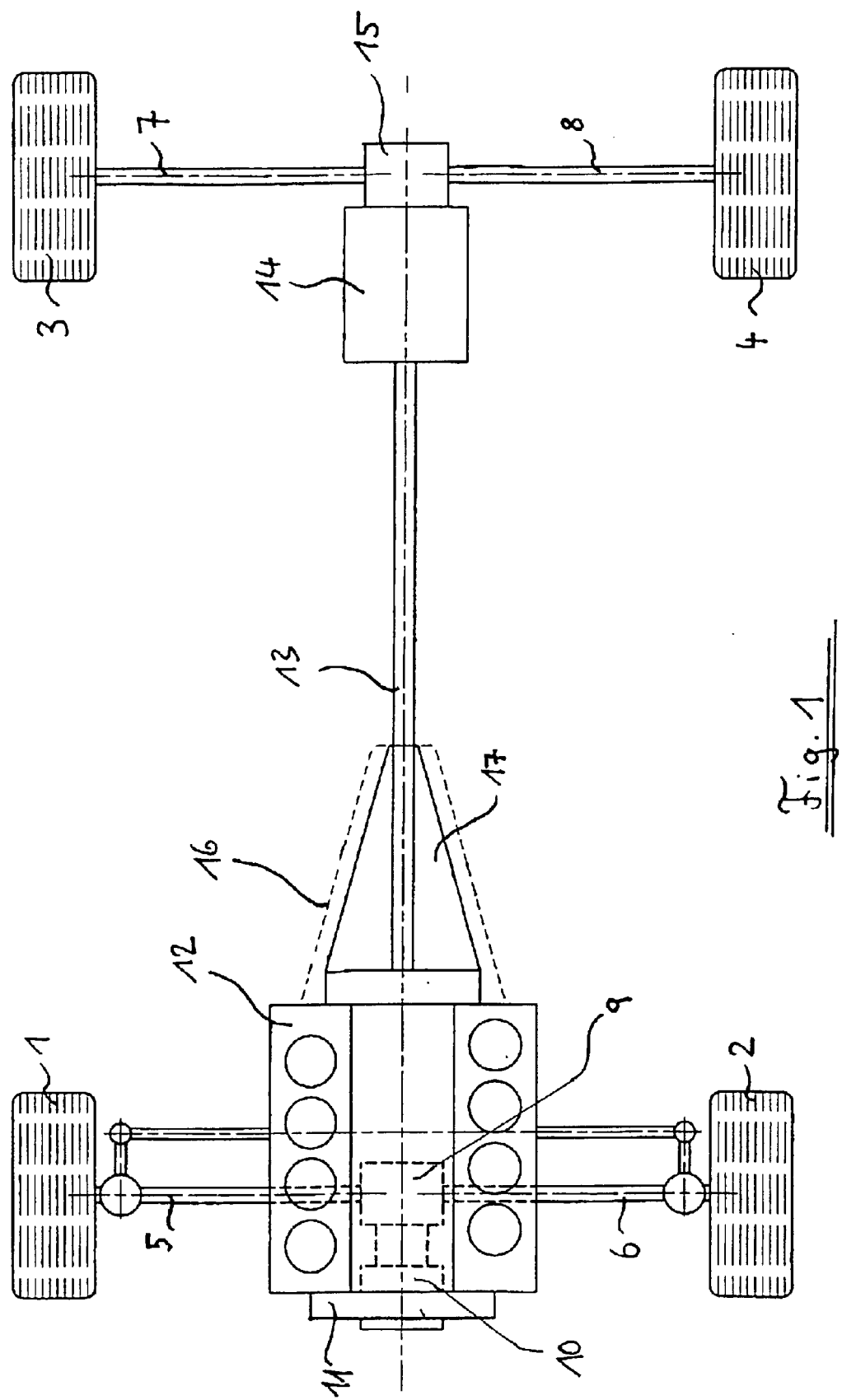
FIG. 1 is a schematic representation of a vehicle according to the invention.

FIG. 1 illustrates a vehicle with front wheels 1, 2 and rear wheels 3, 4, which can be driven respectively by drive shafts 5, 6 and drive shafts 7, 8. The front wheels 1, 2 are connected with an electric motor 11 by way of the assigned drive shafts 5, 6, a front-axle differential 9, as well as a front-axle transmission 10. The electric motor 11 has a relatively large diameter and a short length and is arranged on the forward side of the internal combustion engine 12.

A propeller shaft 13 leads from the internal combustion engine 12 toward the rear to a transmission 14. The transmission 14 may be a manual transmission, an automatic multiposition reduction transmission or an infinitely variable speed transmission, particularly a fully toroidal transmission. The output of the transmission 14 is connected with a rear-axle divider transmission which divides the torque supplied by the internal combustion engine 12 between the two rear wheels 3 and 4.

A fuel cell 17 is provided in an area 16 behind the internal combustion engine 12, where the transmission is arranged in conventional vehicles. The fuel cell 17 is thermally coupled with the internal combustion engine 12. For this purpose, it is flanged directly to the internal combustion engine 12. As an alternative or in addition, a heat exchanger can be provided which feeds the engine waste heat to the fuel cell 17. At least a portion of waste heat of the internal combustion engine 12 is therefore not emitted unutilized into the environment but is used for maintaining the operating temperature of the fuel cell. Such a "heat management" permits an optimization of the efficiency.

The fuel cell 17 can be supplied with hydrogen, for example, by a reformer (not shown). The reformer separates hydrogen from the fuel of the internal combustion engine, such as gasoline, diesel or natural gas, and supplies the hydrogen to the fuel cell 17. Electricity is then generated from the hydrogen and oxygen in the air.

As an alternative, the fuel cell 17 can be supplied with hydrogen from a hydrogen tank arranged in the vehicle. The internal combustion engine may then be either a "hydrogen engine" or an engine that uses natural gas, gasoline or diesel.

The electricity provided by the fuel cell is used for supplying various electric for charging consuming devices in the vehicle and, in addition, for charging a battery which is not shown here. Particularly the electric motor 11 is supplied with electricity by the fuel cell 17. In addition, the fuel cell 17 supplies electricity to electric "by-wire" systems.

The front wheels 1 and 2 can be driven by the electric motor 11, the front-axle transmission 10 and the front-axle divider transmission 9. However, the electric motor 11 is additionally used as the starter for the internal combustion engine 12.

In coasting operation, recovery of braking energy can take place by way of the electric motor 11. Specifically, in coasting operation, electricity can be generated by the electric motor 11, operating as a generator, by way of the front wheels 1, 2, the drive shafts 5, 6, the front-axle divider transmission 9 and the front-axle transmission 10. The electricity generated from braking energy can then be fed to a vehicle battery and can be chemically stored there. Thus, in coasting operation, the electric motor 1 represents a "wear-resistant" brake and permits recovery of braking energy.

Figure 2:
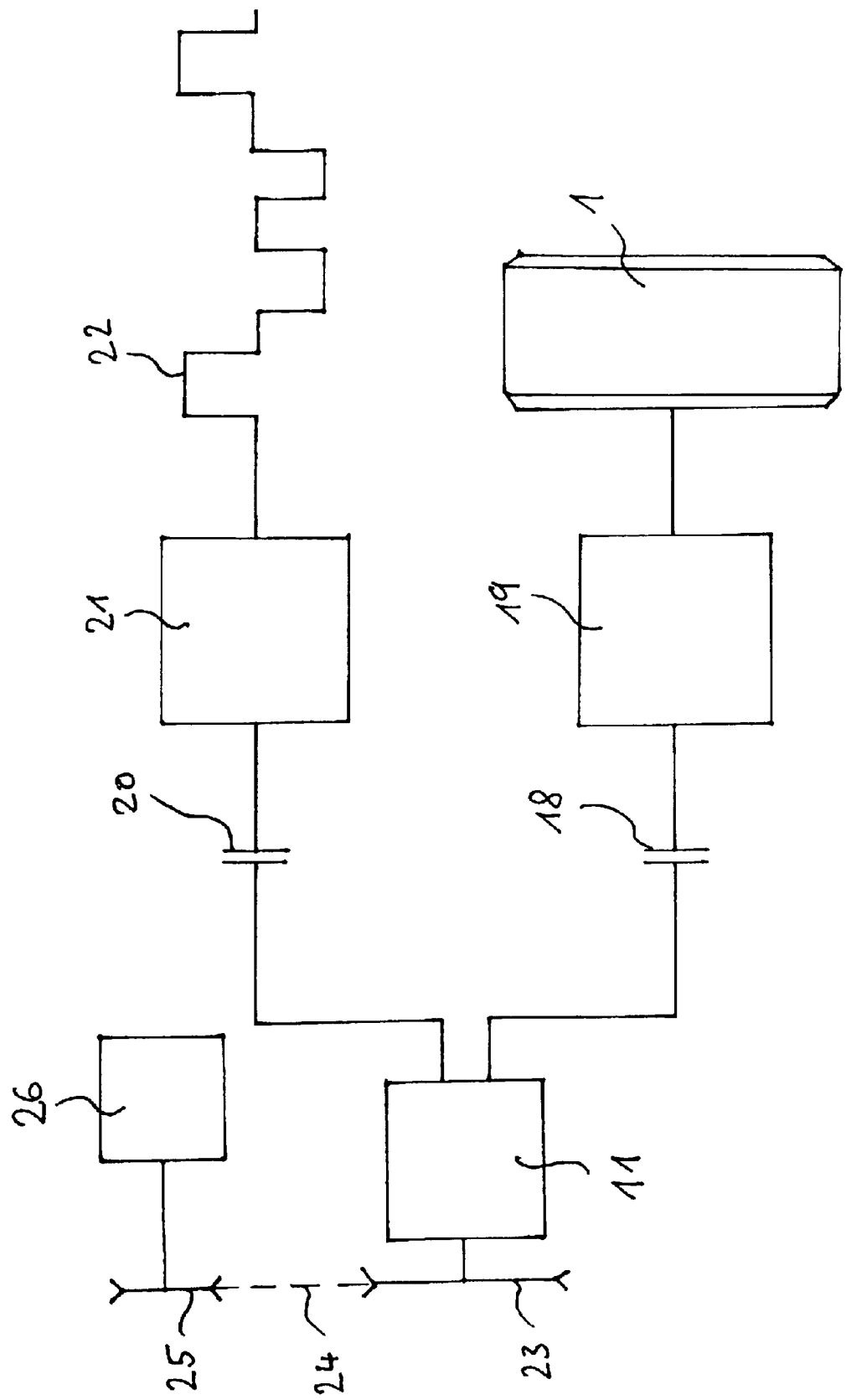
FIG. 2 is a schematic representation of the accessory drive according to the invention.

FIG. 2 describes the method of operating the electric motor 11 in greater detail. The electric motor 11 is connected by way of a coupling 18 and a transmission 19 (in this case, a wheel transmission in a generalized manner) with the two front wheels (only one front wheel 1 is illustrated here). The wheel transmission 19 includes the front-axle divider transmission 9 illustrated in FIG. 1 and the front-axle transmission 10.

The electric motor 11 is also connected by way of another coupling 20 and an internal combustion engine transmission 21 with a crankshaft 22 of the internal combustion engine.

In addition, the electric motor 11 is coupled by way of a belt drive 23 to 25, as well as optionally by way of an auxiliaries transmission, with an auxiliary unit 26. The auxiliary unit 26 may be an air conditioner, a hydraulic pump, etc.

The electric motor 11 is supplied with electricity by the fuel cell 17 by way of electric supply lines not illustrated here. When coupling 18 is closed and coupling 20 is open, a torque can be transmitted to the front wheels by way of the electric motor 11. In this case, the electric motor 11 operates as a front-axle drive. In coasting operation, on the other hand, coasting or braking energy can be mechanically introduced into the electric motor from the front wheels by way of the wheel transmission 19 and the coupling 18. The electric motor then operates as a generator and supplies the generated electricity, for example, to the vehicle battery. This permits recovery of braking energy.

Furthermore, a non-electric front-axle drive can be used. Specifically, when the two couplings 18, 20 are closed and the "primary drive" of the front axle, that is, the electric motor 11, is switched off, the electric motor 11 can be used as a "passive" torque transmission device. That is, by way of the crankshaft 22, the internal combustion engine transmission 21, the coupling 20, the electric motor 11, the coupling 18, and the wheel transmission 19, torque can be transmitted from the internal combustion engine to the front wheels. Thus, also an engine-driven connectable front-wheel drive is conceivable.

Furthermore, there is an auxiliaries drive which is independent of the primary drive. When the engine is uncoupled, the auxiliaries, particularly the air conditioner, can be driven mechanically by the electric motor 11 using power provided by the battery or the fuel cell. This has the result that the air conditioner can become an auxiliary air conditioner and, with an appropriate selection of auxiliaries drive ratios, not all auxiliaries require a separate electric drive when the engine has stopped.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle comprising an internal combustion engine and a fuel cell for generating electric energy, wherein the fuel cell is thermally coupled with the internal combustion engine, and wherein the fuel cell is arranged directly on a housing of the internal combustion engine so that the fuel cell is heated by the internal combustion engine.

2. The vehicle according to claim 1, wherein the fuel cell is arranged between the internal combustion engine and a vehicle rear axle.

3. The vehicle according to claim 1, further comprising:
a reformer which separates fuel for the fuel cell from fuel for the internal combustion engine and feeds the separated fuel to the fuel cell.

4. The vehicle according to claim 2, further comprising:
a drivable rear axle; and
a transmission for varying the rear-axle ratio in an area of the rear axle.

5. The vehicle according to claim 4, wherein the transmission is an infinitely variable speed transmission.

6. The vehicle according to claim 4, wherein the transmission is a fully toroidal transmission.

7. The vehicle according to claim 4, wherein the transmission is a manual transmission.

8. The vehicle according to claim 4, wherein the transmission is an automatic transmission.

9. The vehicle according to claim 1, wherein the internal combustion engine is a hydrogen engine.

10. The vehicle according to claim 1, wherein the internal combustion engine has an electromagnetic timing gear, the electromagnetic timing gear being supplied with electricity from the fuel cell.

11. The vehicle according to claim 4, further comprising:
a connectable electric accessory drive which can be operated as a motor or as a generator, in a forward area of the engine.

12. A vehicle comprising:
an internal combustion engine and a fuel cell for generating electric energy, wherein the fuel cell is thermally coupled with the internal combustion engine,
a connectable electric accessory drive which can be operated as a motor or as a generator, in a forward area of the engine, and a first coupling and a wheel transmission, wherein the accessory drive is connected by way of the first coupling and the wheel transmission with front wheels of the vehicle.

13. A vehicle comprising:
an internal combustion engine and a fuel cell for generating electric energy, wherein the fuel cell is thermally coupled with the internal combustion engine,
a connectable electric accessory drive which can be operated as a motor or as a generator, in a forward area of the engine, and a second coupling and an engine transmission, wherein the accessory drive is kinematically coupled by way of the second coupling and the engine transmission with a crankshaft of the internal combustion engine.

14. The vehicle according to claim 11, wherein the accessory drive is electrically connected with the fuel cell.

15. The vehicle according to claim 11, further comprising:
a belt drive and electric energy consuming devices, wherein the accessory drive is connected by way of the belt drive with the electric energy consuming devices.

16. A method of making a vehicle including an internal-combustion engine and a fuel cell for generating electric energy, the method comprising:
thermally coupling the fuel cell with the internal-combustion engine, wherein the step of thermally coupling the fuel cell with the engine includes placing the fuel cell directly on the housing of the engine so that the fuel cell is heated by the internal combustion engine.

17. The method according to claim 16, further comprising:
placing the fuel cell between the internal-combustion engine and a vehicle rear axle.

18. The method according to claim 17, further comprising:
    placing a transmission for varying the rear-axle ratio near the rear axle.

19. The method according to claim 17, further comprising:
    supplying electric power from the fuel cell to an electromagnetic timing gear of the internal-combustion engine.

20. The method according to claim 18, further comprising:
    placing a connectable electric accessory drive, which can be operated as a motor or as a generator, in a forward area of the internal-combustion engine.

21. A method of making a vehicle including an internal-combustion engine and a fuel cell for generating electric energy, the method comprising:
    thermally coupling the fuel cell with the internal-combustion engine,
    placing a connectable electric accessory drive, which can be operated as a motor or as a generator, in a forward area of the internal-combustion engine, and
    connecting the connectable electric accessory drive, by way of a coupling and a wheel transmission, to front wheels of the vehicle.

22. A method of making a vehicle including an internal-combustion engine and a fuel cell for generating electric energy, the method comprising:
    thermally coupling the fuel cell with the internal-combustion engine,
    placing a connectable electric accessory drive, which can be operated as a motor or as a generator, in a forward area of the internal-combustion engine, and kinematically coupling the accessory drive, by way of a first coupling and an engine transmission, with a crankshaft of the internal-combustion engine.

23. The method according to claim 20, further comprising:
    electrically connecting the accessory drive to the fuel cell.

24. The method according to claim 20, further comprising:
    connecting the accessory drive, by way of a belt drive, to electric energy consuming devices.

* * * * *